(No Model.) 2 Sheets—Sheet 1.
A. SANFORD.
TOE RING FOR CANT HOOKS.
No. 389,941. Patented Sept. 25, 1888.
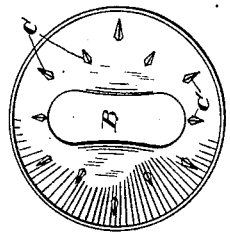
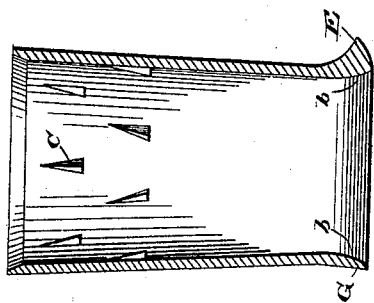
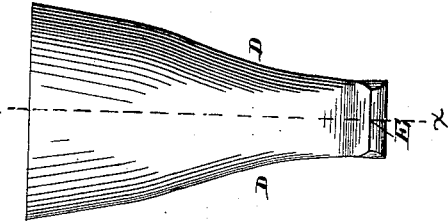
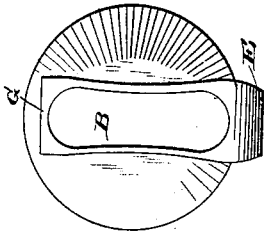
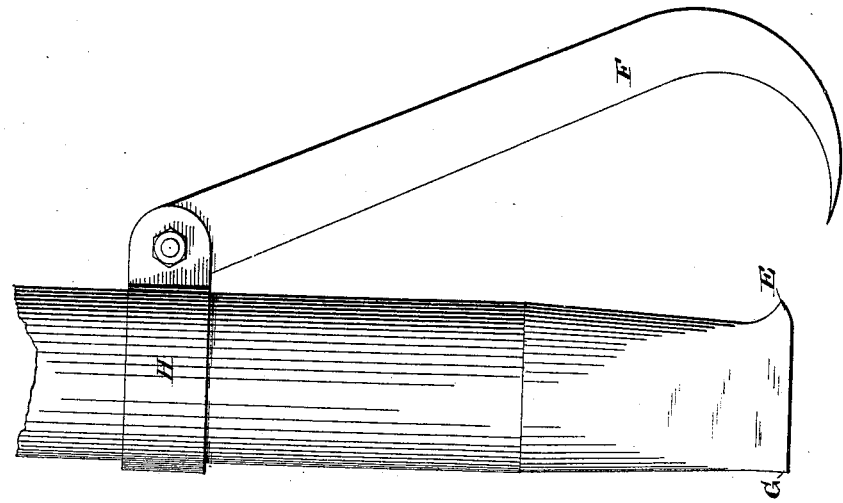
Witnesses.
Chas. R. Burr.
Thomas Durant
Inventor.
Albert Sanford
By Church & Church
his Attorneys.

(No Model.) 2 Sheets—Sheet 2.
A. SANFORD.
TOE RING FOR CANT HOOKS.
No. 389,941. Patented Sept. 25, 1888.
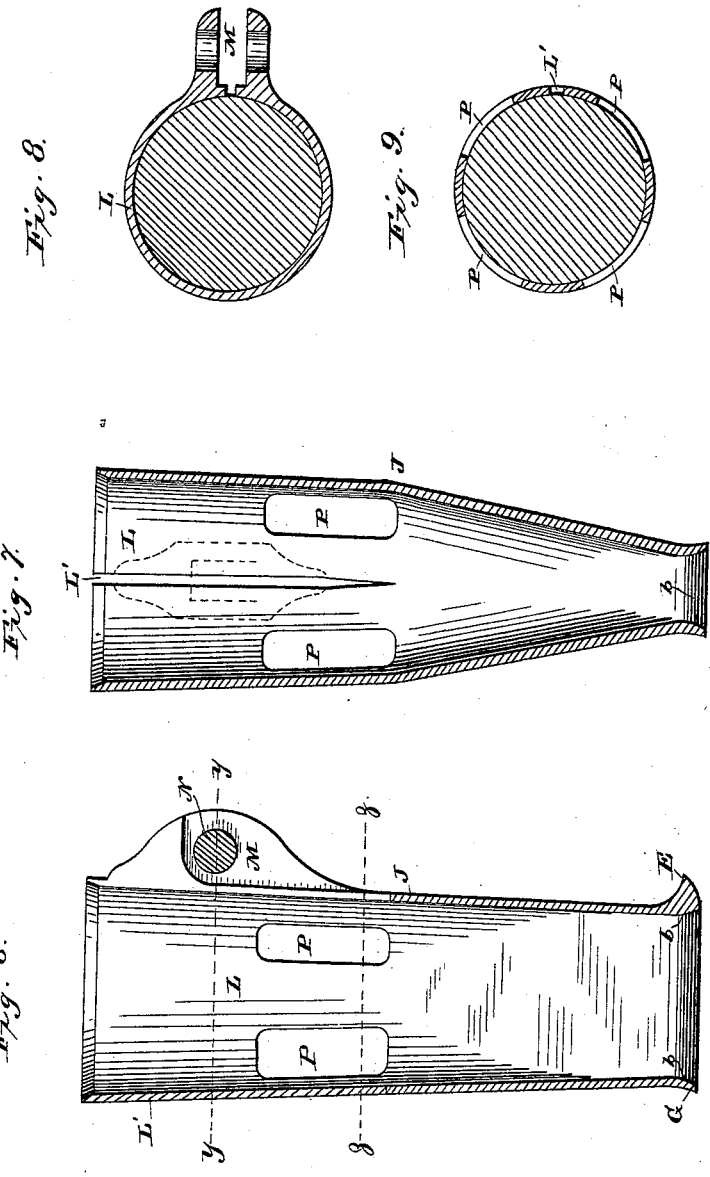

UNITED STATES PATENT OFFICE.

ALBERT SANFORD, OF OSHKOSH, WISCONSIN.

TOE-RING FOR CANT-HOOKS.

SPECIFICATION forming part of Letters Patent No. 389,941, dated September 25, 1888.

Application filed April 19, 1888. Serial No. 271,221. (No model.)

*To all whom it may concern:*

Be it known that I, ALBERT SANFORD, of Oshkosh, in the county of Winnebago and State of Wisconsin, have invented certain new and useful Improvements in Toe-Rings for Cant-Hooks, &c.; and I do hereby declare the following to be a full, clear, and exact description of the same, reference being had to the accompanying drawings, forming a part of this specification, and to the figures and letters of reference marked thereon.

My invention has for its object to provide an improved toe-ring for use particularly on cant-hooks and other lumbermen's implements, and having as features to recommend it the capabilities of being so connected or secured to the stock or handle as to render it impossible to disconnect or loosen it, of affording a firm and secure bearing when the implement is used as a pry or lever, and of being readily inserted between logs or in other situations where the ordinary round toe-ring would not be available.

I will first describe in detail the construction of my said toe-ring, and will then point out its particular features of novelty in the claims at the end of this specification.

Referring to the accompanying drawings, Figure 1 represents a side elevation of a toe-ring constructed in accordance with my invention; Fig. 2, a front elevation of the same; Fig. 3, a top plan view; Fig. 4, a bottom plan, and Fig. 5 a longitudinal vertical sectional view taken on the line *x x*, Fig. 2; Figs. 6 and 7, longitudinal sectional views of a modification of the invention, in which the toe-ring is combined with the clamp which supports the hook or dog of a cant-hook. Fig. 8 is a cross-sectional view taken on the line *y y*, Fig. 6; Fig. 9, a similar view taken on the line *z z* of said Fig. 6.

Similar letters of reference in the several figures indicate the same parts.

The toe-ring at the upper end is made of cylindrical form and thence tapers toward the lower end, where it is flattened, so as to leave an oblong opening, B, as shown in Fig. 4, said oblong opening being preferably beveled outward slightly at its edges, as shown at *b*, so as to cause the wood of the stock or handle inserted in said toe-ring to be expanded in the lower end of said stock or handle, and thereby assist in holding the toe-ring firmly in place.

On the interior of the toe-ring, preferably in the upper portion thereof, I have formed one or more series of triangular pyramidal-shaped points, C, in line with the longitudinal axis of the ring and arranged in regular rows, or in zigzag order, as preferred, and with the apex of each point toward the top of the ring, so that when the stock or handle is driven into the ring said points will not tend to turn the stock, but simply force the wood of the stock apart and then allow the same to expand back and take a bearing on the bases of said points, thereby making a very firm connection.

The flattening of the lower end of the ring enables it to be pushed between logs or other objects and also to be shoved farther under an object more easily than a round ring, such as heretofore used.

The taper of the inside of the ring is made gradual, in order to facilitate the fitting of the stock or handle; but instead of being similarly formed on the outside it is concaved slightly, as shown at D in Fig. 2, which renders it less liable to slip out when placed between two logs or objects, and gives a better leverage than if it were left gradually tapered.

A projection, E, is formed on the front of the ring on its lower end for co-operating with a swinging hook, F, such as commonly used in this class of implements, and a slight projection, G, is made at the back of the ring at the lower end opposite the projection E, the object of which is to enable the said projections E and G to co-operate in prizing an object by affording a better bearing-surface and decreasing the liability to slip on flat surfaces—such as floors, bunks, or bolsters of wagons or sleighs, or wherever it may be used—as well as to strengthen the ferrule at the back and thus afford strong holding-points at the ends of the flat or slightly-concave sides of the end of the ferrule.

The toe-ring above described is adapted to be used in connection with a swinging hook, F, carried by an ordinary clamp, H, applied to the stock or handle above said toe-ring, as shown in Fig. 1; but in Figs. 6 to 9 I have shown a modification in which the toe-ring and the clamp or clasp for holding the hook are formed integral.

Having reference to said last-mentioned figures, I would state that so much of the device therein shown below the point J, Figs. 6 and 7, is substantially the same construction as the toe-ring illustrated in the preceding figures; but above said point J the ring is extended so as to form a band or clamp, L, split as at L', and provided with a socket, M, in which to pivot a cant-hook on a bolt, N, a nut being provided on said bolt for the purpose of drawing the said split band closely around the handle or stock after the latter has been introduced. The portion between the lower part or toe-ring proper and the band or clamp portion L is formed with openings P, as many in number as may be desired, and is consistent with the leaving of sufficient connecting metal to properly maintain the relative position of the toe-ring proper and band or clamping portion L, and at the same time protect the handle or stock between said parts from being cut or worn in use, such construction also reducing the amount of metal used, thus lightening the ferrule and also forming a very firm grip for the stock, as the latter will bulge slightly outward through the openings.

The toe-ring shown in Figs. 1 to 5 may be two, four, six, or any number of inches in length and contain any desired number of pyramidal points or rows of the same to hold it in place. The device shown in Figs. 6 to 9 may also be of any size desired.

In using the implement as a lever the slightly-concave sides of the end prevent the ferrule slipping off a round object sidewise, and the concavities between the end and base serve to seat the object slightly back from the end, rendering the engagement much more certain, as well as affording a sharp bearing-edge for use on a flat surface, the thickened end or projection effectually preventing all liability of crushing or breakage.

Having thus described my invention, what I claim as new is—

1. As a new article of manufacture, a toe-ring substantially cylindrical at the upper end and tapered down to an oblong shape at the lower end and having the tapered inner surface, substantially as described.

2. As a new article of manufacture, a substantially-cylindrical toe-ring flattened at its lower end and having the oblong opening therein, substantially as described.

3. As a new article of manufacture, a toe-ring substantially cylindrical at the upper end and having flattened sides, and the oblong opening at the lower end and the angular pyramidal-shaped points or projections on its inner surface for securing it to the stock or handle, substantially as described.

4. As a new article of manufacture, a toe-ring substantially circular at its upper end and having the oblong opening in the lower end, having its flattened sides concave on the outer surface, substantially as described.

5. As a new article of manufacture, a toe-ring substantially circular at its upper end, having the oblong opening in its lower end, the gradually-tapered inner surface, and the flattened sides concave on the outer surfaces, substantially as described.

6. The toe-ring having the circular opening in its upper end, the oblong opening in its lower end, the gradually-tapered inner surface, the flattened sides concave on the outer surfaces, and the angular pyramidal-shaped points on its inner surface, substantially as described.

7. As a new article of manufacture, a toe-ring substantially circular at its upper end, having the oblong opening in its lower end, the flattened curved sides, and the front projection, E, at its lower end, substantially as described.

8. As a new article of manufacture, a toe-ring substantially circular at its upper end, having the oblong opening in its lower end, the flattened curved sides, and the front projection, E, and rear projection, G, at its lower end, substantially as described.

9. As a new article of manufacture, a toe-ring having the solid socket portion at one end, the split band at the opposite end, and the intermediate portion having openings therein, substantially as described.

10. As a new article of manufacture, a toe-ring having the solid socket portion at one end, the split band at the opposite end, and the intermediate portion having the longitudinal slots therein, substantially as described.

11. As a new article of manufacture, a toe-ring having the tapered and flattened socket portion at one end, the cylindrical split band at the opposite end, and the intermediate connecting portion having the longitudinal slots therein, substantially as described.

12. The toe-ring flattened at its lower end, and having the oblong opening therein beveled or flared outwardly, as described.

ALBERT SANFORD.

Witnesses:
C. R. NEVITT, Jr.,
WALTER S. DROPPERS.